US012183975B2

(12) United States Patent
Park et al.

(10) Patent No.: US 12,183,975 B2
(45) Date of Patent: Dec. 31, 2024

(54) ANTENNA APPARATUS

(71) Applicant: AGENCY FOR DEFENSE DEVELOPMENT, Daejeon (KR)

(72) Inventors: Byung Chul Park, Daejeon (KR); Seung Ho Kim, Daejeon (KR); Kun Sup Kwon, Daejeon (KR); Jong Wan Heo, Daejeon (KR); Sung Jae Lee, Daejeon (KR); Ki Min Hwang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 19 days.

(21) Appl. No.: 17/977,359

(22) Filed: Oct. 31, 2022

(65) Prior Publication Data

US 2024/0145935 A1 May 2, 2024

(51) Int. Cl.
*H01Q 15/16* (2006.01)
*H01Q 13/02* (2006.01)
*H01Q 19/13* (2006.01)

(52) U.S. Cl.
CPC ......... *H01Q 15/16* (2013.01); *H01Q 13/0208* (2013.01); *H01Q 19/132* (2013.01)

(58) Field of Classification Search
CPC ... H01Q 15/16; H01Q 13/0208; H01Q 19/132
See application file for complete search history.

(56) References Cited

U.S. PATENT DOCUMENTS 4,963,878 A * 10/1990 Kildal .................. H01Q 19/134 343/781 P
6,919,855 B2 * 7/2005 Hills .................. H01Q 13/0216 343/781 CA
8,102,324 B2 * 1/2012 Tuau .................... H01Q 19/193 343/781 CA
9,698,490 B2 * 7/2017 Wright ................. H01Q 19/193
10,658,756 B1 * 5/2020 Marrero-Fontanez ....................... H01Q 1/288
2013/0307719 A1 11/2013 Granet et al.
2014/0368408 A1 12/2014 Tuau et al.

(Continued)

FOREIGN PATENT DOCUMENTS

KR 20100049933 A 5/2010
KR 20130141580 A 12/2013

(Continued)

OTHER PUBLICATIONS

Joongki Park et al., "Design of High-gain Antenna for Satellite Communication with Miniaturized Feed Structure", The Transactions of the Korean Institute of Electrical Engineers, vol. 67, No. 11, pp. 1471-1476 (2018).

*Primary Examiner* — Dimary S Lopez Cruz
*Assistant Examiner* — Austin M Back
(74) *Attorney, Agent, or Firm* — MILES & STOCKBRIDGE P.C.

(57) ABSTRACT

An antenna apparatus includes: a parabolic reflector; a dielectric support pedestal; a sub-reflector connected to an upper part of the dielectric support pedestal; and a waveguide connected to a lower part of the dielectric support pedestal, wherein the parabolic reflector has a curved surface in which a ratio of a focal length to a diameter is greater than a preset value, and at least one corrugation configured to suppress a cross polarization is formed in a region of the dielectric support pedestal.

10 Claims, 11 Drawing Sheets

(56) References Cited

U.S. PATENT DOCUMENTS

2018/0175510 A1* 6/2018 Tuau .................... H01Q 19/193
2021/0305717 A1* 9/2021 Hou ....................... H01Q 19/10

FOREIGN PATENT DOCUMENTS

KR 20140119782 A 10/2014
KR 20150108859 A 9/2015

* cited by examiner

ANTENNA APPARATUS

FIELD OF THE INVENTION

The embodiments of the present invention generally relate to an antenna apparatus, and more particularly to, an antenna apparatus having a parabolic reflector.

DISCUSSION OF THE RELATED ART

A parabolic reflector antenna is widely used as an antenna for satellite communication. The parabolic reflector antenna may obtain a high signal gain for satellite communication, and may relatively easily implement a wide bandwidth necessary to support a large-capacity communication speed. Meanwhile, the antenna for satellite communication needs to satisfy the antenna radiation pattern, which is a standard recommended by the International Telecommunication Union ("ITU"). To accomplish this, it is important to design a feed horn to satisfy the cross polarization pattern recommended by the ITU.

A parabolic curved surface of a main reflector for obtaining a high-gain antenna signal generally has a value F/D (F: parabolic focal length, D: antenna diameter) of 0.25 or more. On the other hand, when the parabolic curved surface is laterally viewed, a radio-wave radiation region of the feed horn located at a focal point of the parabolic curved surface is exposed outward of the parabolic curved surface. As a result, some of electromagnetic waves radiated from the feed horn may be directly radiated to the lateral side of the antenna without being reflected at the parabolic reflector.

When the polarized wave of the electromagnetic waves collides with a conductive material such as a reflector, a phase thereof may be reversed. The electromagnetic waves that do not reach the parabolic reflector and are directly radiated outward of the main reflector have a phase opposite that of the electromagnetic waves that have reached the parabolic reflector. Therefore, when such a parabolic curved surface is used, a cross polarization level radiated laterally may exceed the level recommended by the ITU.

Accordingly, there is a need for techniques capable of lowering the cross polarization level while maintaining a high antenna gain.

SUMMARY OF THE INVENTION

Accordingly, the embodiments of the present invention are directed to an antenna apparatus that substantially obviates one or more problems due to limitations and disadvantages of the related art.

An aspect is to reduce a cross polarization level in a direction of the lateral side of the antenna as some of electromagnetic waves radiated at a feed horn of a reflector antenna are directly radiated to a lateral side of the antenna without being reflected at a main reflector.

According to the present invention, an antenna apparatus having a high-gain focal length to antenna diameter ratio includes a corrugation formed in a region of a dielectric support pedestal to suppress cross polarization, which makes it possible to lower a level of radio waves in a lateral direction of a feed horn, and reduces a cross polarization level in a lateral direction of the antenna apparatus, thus satisfying the antenna standard pattern recommended by the International Telecommunication Union (ITU).

The technical effects are not limited to the aforementioned effects, and other effects not mentioned will be clearly understood by those skilled in the art from the detailed description and the claims.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the antenna apparatus includes: a parabolic reflector; a dielectric support pedestal; a sub-reflector connected to an upper part of the dielectric support pedestal; a waveguide connected to a lower part of the dielectric support pedestal, wherein the parabolic reflector may have a curved surface in which a ratio of a focal length to a diameter is greater than a preset value, and at least one corrugation configured to suppress a cross polarization may be formed in a region of the dielectric support pedestal.

It is to be understood that both the foregoing general description and the following detailed description are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EXAMPLE EMBODIMENTS

Reference will now be made in detail to the embodiments of the present invention, examples of which are illustrated in the accompanying drawings.

Terms used in example embodiments are general terms that are currently widely used while their respective functions in the present disclosure are taken into consideration. However, the terms may be changed depending on the intention of one of ordinary skilled in the art, legal precedents, emergence of new technologies, and the like. Also, in particular cases, terms that are arbitrarily selected by the applicant of the present disclosure may be used, and in this case, the meanings of these terms may be described in detail in the corresponding disclosure. Accordingly, the terms used herein should be defined based on the meanings thereof and the content throughout the specification, instead of a simple name of the term.

When a part "comprises or includes" a constituent element through the specification, this means that the part may further include other constituent elements, rather than excluding other constituent elements, unless other stated.

The expression "at least one of a, b, and c" through the specification may include the following meanings: 'a alone', 'b alone', 'c alone', 'both a and b together', 'both a and c together', 'both band c together', or 'all three of a, b, and c together'.

Throughout the specification, the term "corrugation" means a portion that protrudes outward from a surface of an object, and a detailed protrusion shape thereof is not particularly limited. When a plurality of protruded portions is provided, they become separate corrugations. The corrugation may be integrated with the object, and may be separated from or mounted to the object. In addition, a material of the corrugation may be identical to or different from the rest of the object except for the respective corrugation.

Throughout the specification, the term "off-axis angle" refers to an azimuth obtained when the focal point of the antenna apparatus is taken as an origin and the front of the center of the antenna apparatus is taken as a reference axis. In an orientation of the antenna apparatus, the off-axis angle may be 0 degrees. In a direction perpendicular to the orientation of the antenna apparatus, the off-axis angle may be 90 degrees. In a direction opposite the orientation of the antenna apparatus, the off-axis angle may be 180 degrees.

Example embodiments of the present disclosure will be described below with reference to the drawings.

Figure 1:
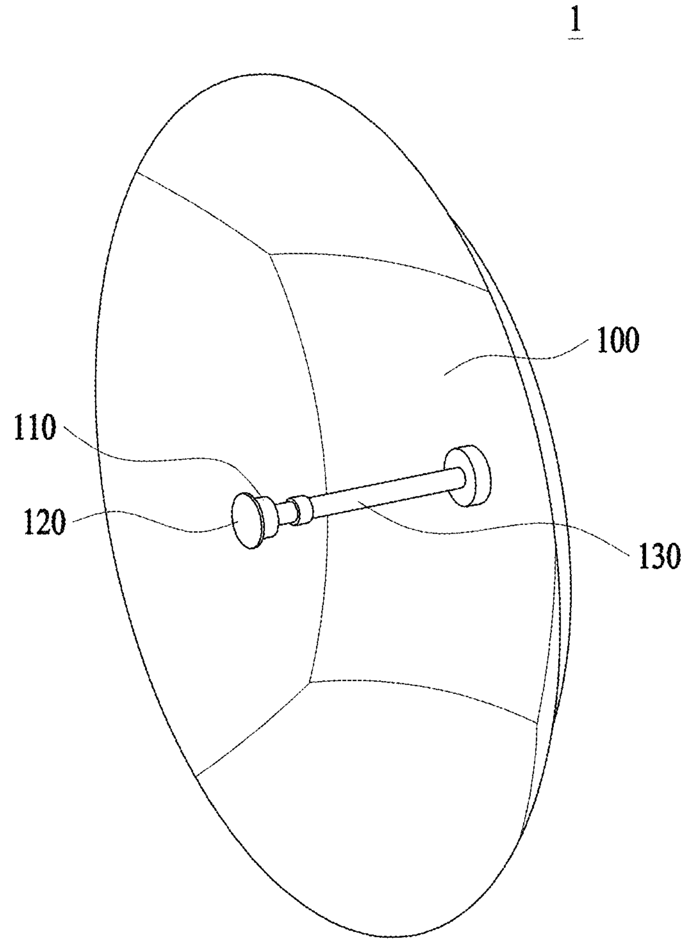
FIG. 1 illustrates an antenna apparatus provided with a dielectric support pedestal according to an example embodiment.

FIG. 1 illustrates an antenna apparatus provided with a dielectric support pedestal according to an example embodiment.

According to an example embodiment, an antenna apparatus 1 may include a main reflector 100, a sub-reflector 120, a dielectric support pedestal 110, and a waveguide 130. In the antenna apparatus 1 illustrated in FIG. 1, merely constituent elements relating to the example embodiment are illustrated. Thus, as will be understood by those skilled in the art, in addition to the constituent elements illustrated in FIG. 1, other general-purpose constituent elements may be further included in the antenna apparatus 1.

Radio waves may be supplied with power through an inlet of the waveguide 130, pass through the dielectric support pedestal 110, and be reflected at the sub-reflector 120. The sub-reflector 120 is located at the focal point of the main reflector 100. Thus, the radio waves reflected at the sub-reflector 120 may be further reflected at the main reflector 100 and may be emitted in the orientation of the antenna apparatus. In this case, a curved surface of the main reflector 100 may be a parabolic curved surface. However, the present disclosure is not limited thereto. The curved surface of the main reflector 100 may be any curved surfaces with one or more focal points.

A value F/D, which is a ratio of a focal length to a diameter, may be greater than a preset value to obtain a high gain of the reflector of the antenna apparatus. Where, F means the focal length and D means the diameter of the main reflector. As an example, the value F/D may be set to be equal to or greater than 0.25 to obtain the high gain of the reflector of the antenna apparatus.

Figure 2:
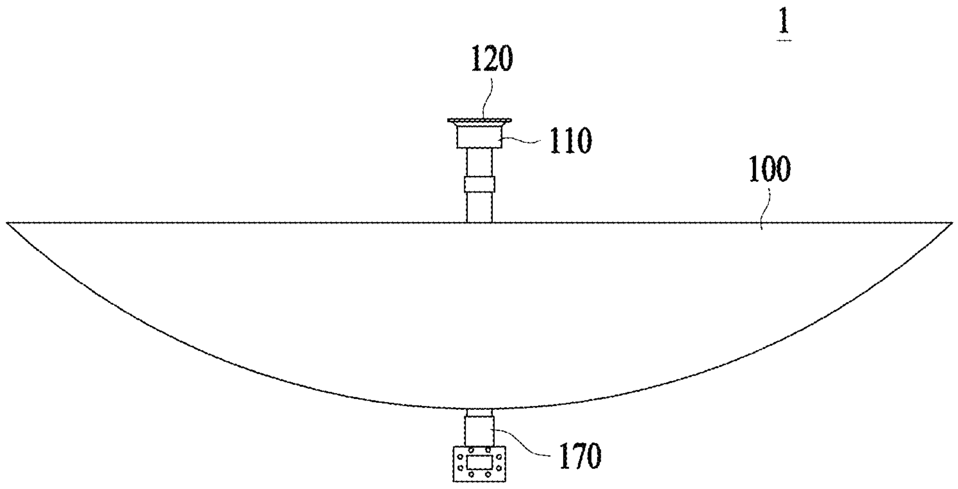
FIG. 2 illustrates a top view of the antenna apparatus according to an example embodiment.

FIG. 2 illustrates a top view of the antenna apparatus according to an example embodiment.

The sub-reflector 120 may be located at the focal point of the main reflector 100. As the value F/D increases, the focal length may become longer than the diameter. Thus, the sub-reflector 120 becomes further away from a reflective surface of the main reflector 100. In FIG. 2, the sub-reflector 120 is illustrated to be exposed to the outside without being hidden by the main reflector 100. In this case, some of the radio waves reflected at the sub-reflector 120 may travel to a lateral side of the antenna apparatus without being reflected at the main reflector 100. As a result, a cross polarization level in the lateral side direction of the antenna apparatus may become higher. When the cross polarization level is equal to or higher than a certain level, it is impossible to comply with the antenna standard pattern recommended by International Telecommunication Union (ITU), which may result in a degradation in communication quality and performance.

The dielectric support pedestal 110 may include a corrugation formed to suppress (e.g., reduce) the cross polarization. In other words, the corrugation may be formed in a region of the dielectric support pedestal 110 to suppress the cross polarization. For example, the corrugation may have a hollow cylindrical shape whose axis is arranged coaxially with a central axis of the dielectric support pedestal 110. The corrugation may be formed to protrude from the dielectric support pedestal 110 along a direction of the central axis of the dielectric support pedestal 110. According to an example embodiment, a plurality of corrugations may be formed in an upper part of the dielectric support pedestal 110.

According to an example embodiment, the antenna apparatus 1 may further include a polarizer 170 connected to the waveguide 130. According to an example embodiment, the polarizer 170 may be a polarizer for circular polarization. For example, the polarizer 170 may include at least one of a septum polarizer, a corrugated polarizer, and a polarizer to which a dielectric vane is applied.

Figure 3:
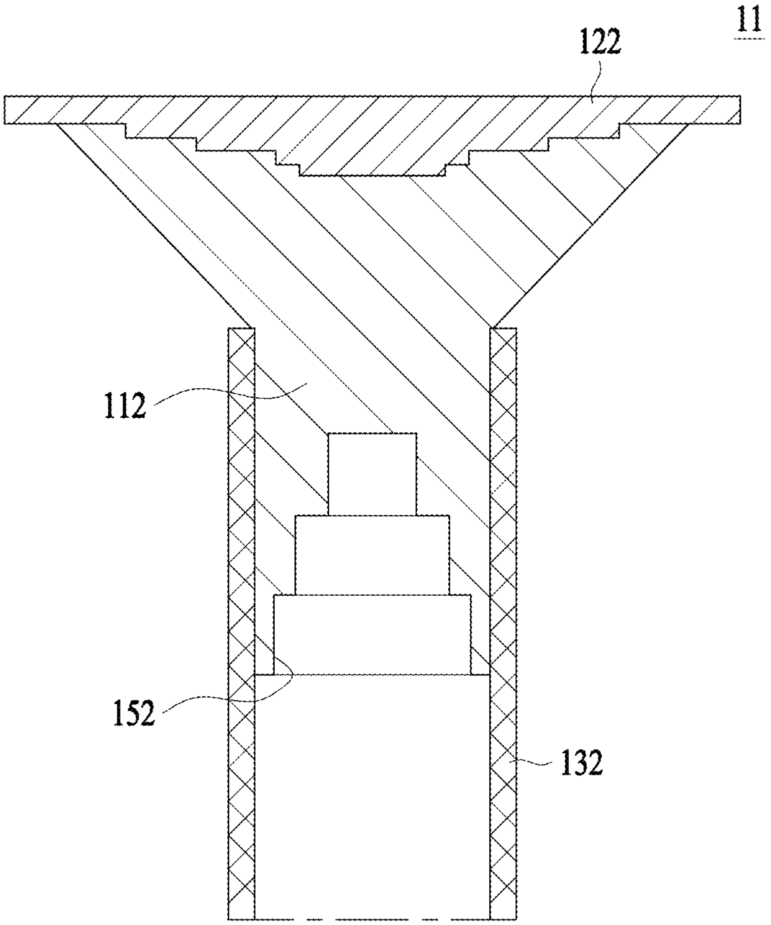
FIG. 3 illustrates a cross-section of a feed horn included in the antenna apparatus according to an example embodiment.

FIG. 3 illustrates a cross-section of a feed horn included in the antenna apparatus according to an example embodiment.

A feed horn 11 may include a dielectric support pedestal 112, a sub-reflector 122, and a waveguide 132. Further, the feed horn 11 may further include a step-like impedance matching part 152 for impedance matching provided in the dielectric support pedestal 112.

Figure 4:
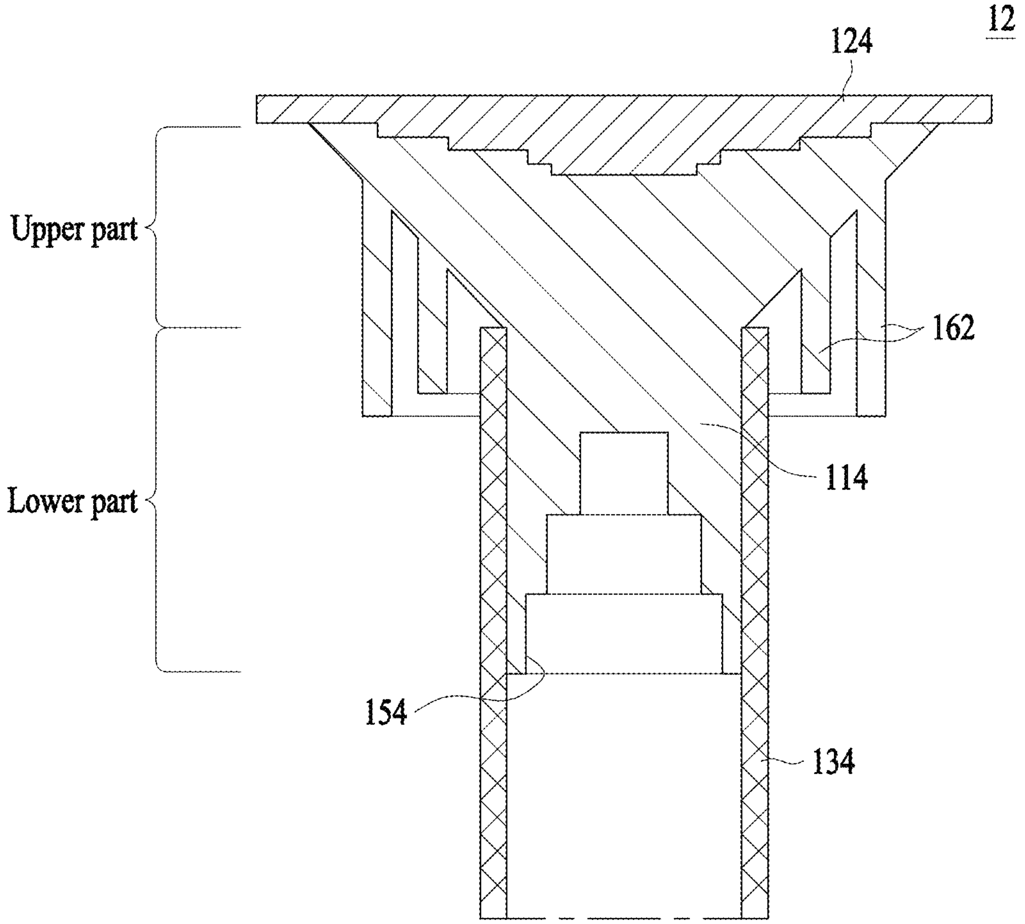
FIG. 4 illustrates a cross-section of a feed horn included in an antenna apparatus according to another example embodiment.

FIG. 4 illustrates a cross-section of a feed horn included in an antenna apparatus according to another example embodiment.

A feed horn 12 may include a dielectric support pedestal 114, a sub-reflector 124, and a waveguide 134. According to an example embodiment, the dielectric support pedestal 114, the sub-reflector 124, and the waveguide 134 of FIG. 4 may correspond to the dielectric support pedestal 110, the sub-reflector 120, and the waveguide 130 of FIGS. 1 and 2, respectively. Further, the feed horn 12 may further include a step-like impedance matching part 154 for impedance matching provided in the dielectric support pedestal 114.

A corrugation 162 may be formed in a region of the dielectric support pedestal 114. The corrugation 162 may be formed in a region of an upper part of the dielectric support pedestal 114. For example, the corrugation 162 may be formed to protrude from the dielectric support pedestal 114 along a direction of a central axis of the dielectric support pedestal 114. According to an example embodiment, the corrugation 162 may be formed by chamfering a portion of an upper part of a hollow cylindrical shape.

According to an example embodiment, a plurality of corrugations 162 may be formed in the upper part of the dielectric support pedestal 114. The plurality of corrugations 162 may have different heights. More specifically, an inner diameter of a first corrugation of the plurality of corrugations 162 may be greater than an outer diameter of a second corrugation of the plurality of corrugations 162. The height of the first corrugation may be greater than the height of the second corrugation.

In the present disclosure, by forming the corrugations 162 in the dielectric support pedestal 114, it is possible to suppress the cross polarization level. In other words, by the corrugations 162 formed in the dielectric support pedestal 114, it is possible to reduce radio waves reflected at the sub-reflector 124 from being radiated directly toward the lateral side of the antenna apparatus without being reflected at the main reflector 100. According to an example embodiment, the dielectric support pedestal 114 and the corrugations 162 may be fabricated integrally with each other by molding or the like to prevent a boundary from occurring at a portion in which the upper part of the dielectric support pedestal 114 and the corrugations 162 are brought into contact with each other.

The dielectric support pedestal 114 may be any structure made of a dielectric material as long as it is provided between the sub-reflector 124 and the waveguide 134. In FIG. 4, the upper part of the dielectric support pedestal 114 is illustrated to be formed in a frustum shape and a lower part thereof is illustrated to be formed in a cylindrical shape leading to the frustum shape of the upper part. However, such shapes are merely examples. The upper part and the lower part may have different shapes from the above shapes. The shapes of the upper part and the lower part may be identical to or different from each other.

According to an example embodiment, the dielectric of the dielectric support pedestal 114 may have a dielectric constant greater than 2. For example, a material of the dielectric may be Teflon, alumina, ceramic, or the like.

Figure 5:
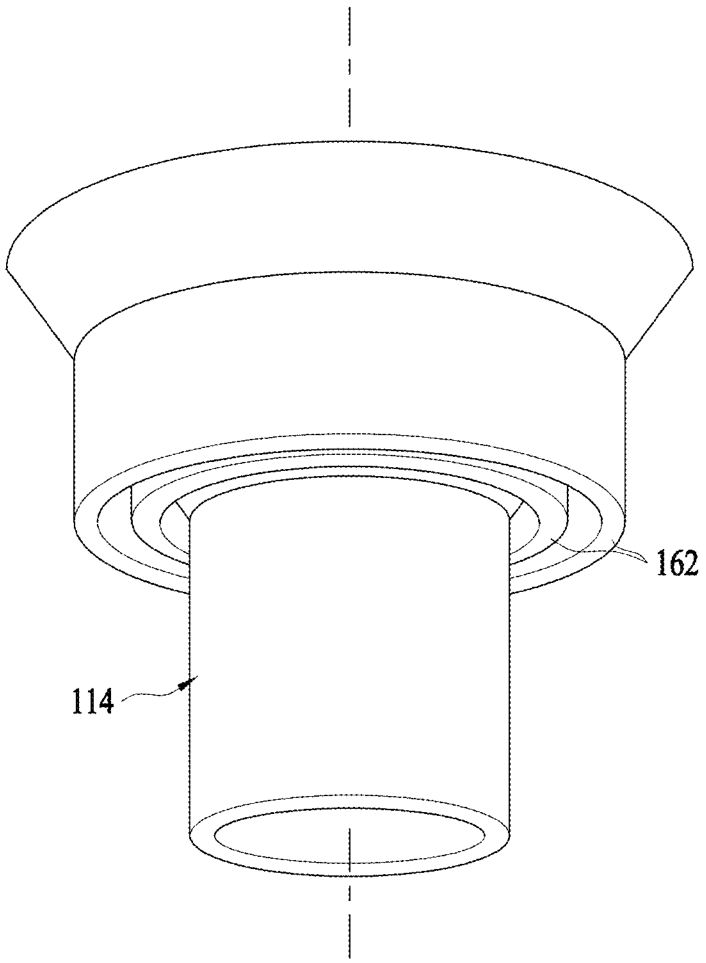
FIG. 5 illustrates a dielectric support pedestal having corrugations formed therein when viewed from a lateral side.
Figure 6:
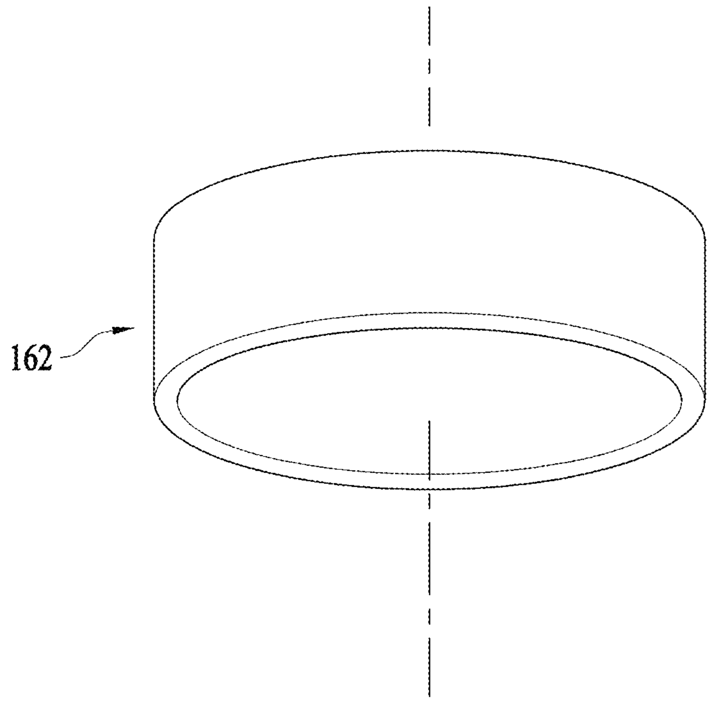
FIG. 6 illustrates a shape of the corrugation according to an example embodiment.

FIG. 5 illustrates the dielectric support pedestal 114 in which the corrugations 162 are formed when viewed from one lateral side. FIG. 6 illustrates the shape of the corrugations 162 according to an example embodiment.

Figure 7:
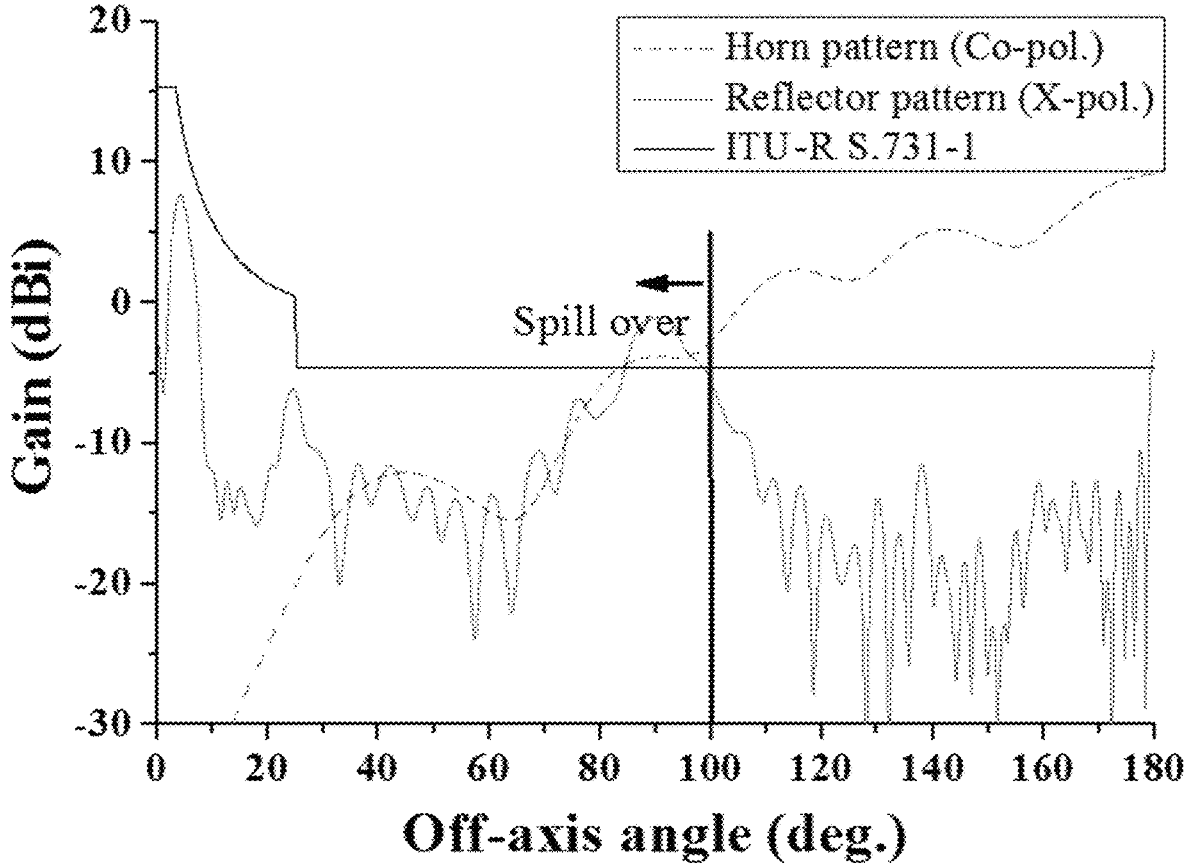
FIG. 7 illustrates a gain characteristic graph of the antenna apparatus using the dielectric support pedestal of FIG. 3.

FIG. 7 illustrates a gain characteristic graph of the antenna apparatus using the feed horn 11 of FIG. 3.

As described above, the high-gain antenna has the value F/D of a high level. As a result, as illustrated in FIG. 2, a position of the sub-reflector, which corresponds to the focal point of the main reflector, may be set to protrude forward of the antenna apparatus. In this case, among the radio waves reflected at the sub-reflector, the radio waves that do not reach an edge portion of the main reflector are not reflected at the main reflector and are directly radiated. Such a phenomenon is called a spill over. Referring to the graph of FIG. 7, at the off-axis angle of 100 degrees or less, the spill over phenomenon occurs in which radio waves that are not reflected at the main reflector are directly radiated to the lateral side of the antenna apparatus.

In FIG. 7, the horn pattern represents the gain characteristic of the feed horn except for the main reflector. Thus, the horn pattern represents the gain characteristic of the radio waves reflected at the sub-reflector via the waveguide and the dielectric support pedestal. From FIG. 7, it can be seen that the gain of the horn pattern is somewhat high in a certain range of the off-axis angle of about 100 degrees or less. As a result, the reflector pattern that represents the gain characteristic of the entire antenna apparatus has a gain higher than ITU-R S.731-1 in the range of the off-axis angle of 100 degrees or less. This fails to satisfy the standard recommended by the ITU.

Figure 8:
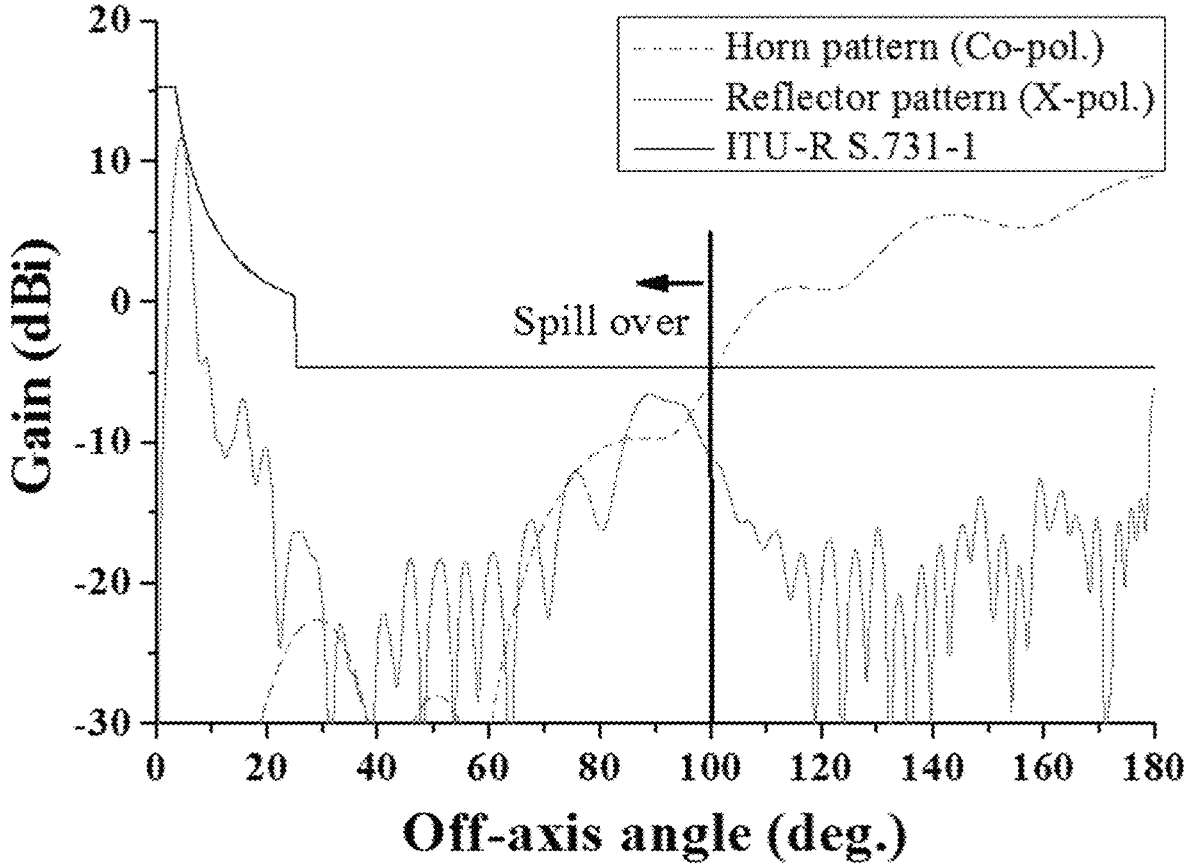
FIG. 8 illustrates a gain characteristic graph of the antenna apparatus using the dielectric support pedestal of FIG. 4, according to an example embodiment.

FIG. 8 illustrates a gain characteristic of the antenna apparatus using the feed horn 12 of FIG. 4.

Unlike the antenna apparatus of FIG. 7 using the feed horn 11 of FIG. 3, it can be seen from FIG. 8 that the horn pattern has a lower level than that in FIG. 7 in the range of the off-axis angle of about 100 degrees or less. As a result, the reflector pattern has a lower gain than the ITU-R S.731-1 in the range of the off-axis angle of about 100 degrees or less. This satisfies the standard recommended by ITU.

Figure 9:
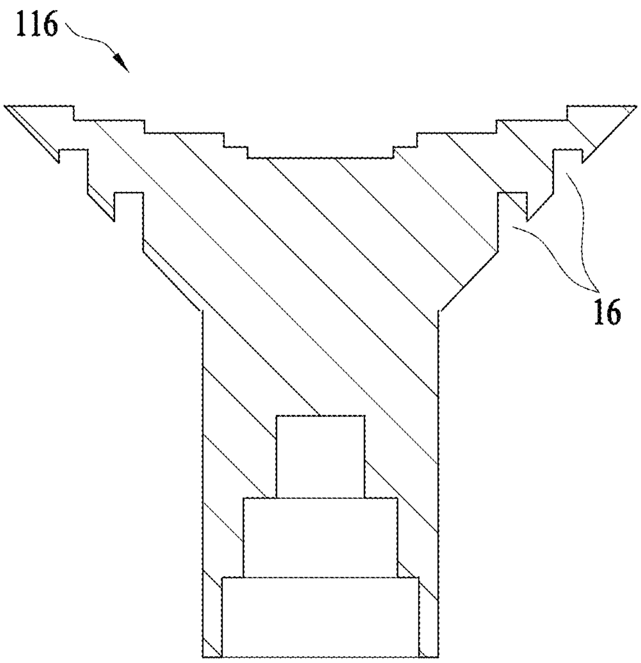
FIGS. 9 and 10 illustrate cross-sections of the dielectric support pedestal according to an example embodiment.
Figure 10:
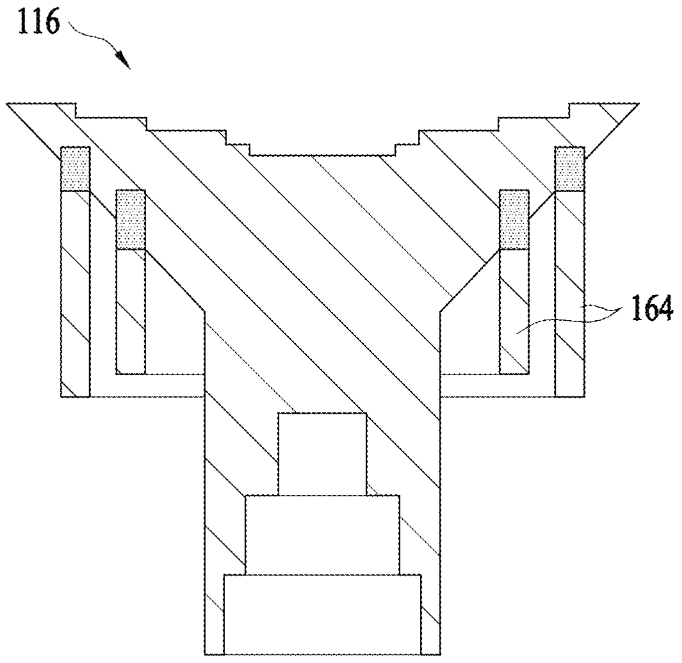

FIGS. 9 and 10 illustrate cross-sections of a dielectric support pedestal according to an example embodiment.

According to an example embodiment, a dielectric support pedestal 116 may correspond to the dielectric support pedestal 110 of FIGS. 1 and 2. In an example embodiment, the dielectric support pedestal 116 may include a mounting area 16 to which a corrugation 164 is mounted. The corrugation 164 may be mounted to or separated from the dielectric support pedestal. Thus, the corrugation suitable for any situation may be mounted to adjust the cross polarization level. According to an example embodiment, a plurality of mounting areas 16 to which a plurality of corrugations 164 having different heights and thicknesses may be mounted may be formed. Here, the plurality of mounting area 16 may have any structure as long as the corrugations 164 may be mounted to or separated from the dielectric support pedestal 116. For example, each of the mounting areas 16 may have a threaded structure in which a thread corresponding to the corrugation 164 is formed so that the corrugation 164 may be screwed into the thread, a structure in which the corrugation 164 is fitted into the mounting area 16 and is held in the mounting area 16 by lateral pressure and frictional force, a structure in which the corrugation 164 may be bonded to the mounting area 16 by an adhesive, or the like.

Although in FIG. 10 the mounting area 16 is illustrated to be formed in the upper part of the dielectric support pedestal 116. However, such a configuration is merely an example. The mounting area 16 may be formed in other portions such as the lower part of the dielectric support pedestal 116.

Figure 11:
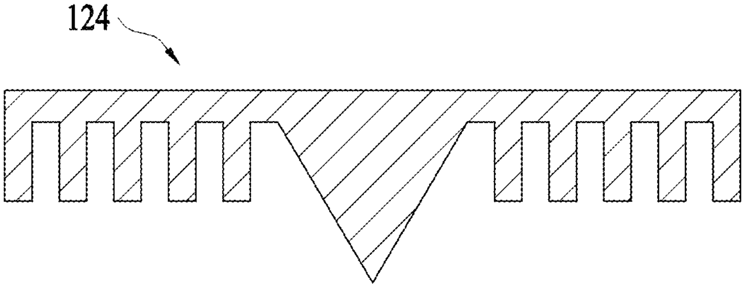
FIG. 11 illustrates a sub-reflector according to an example embodiment.

FIG. 11 illustrates a sub-reflector according to an example embodiment. A sub-reflector 124 may correspond to the sub-reflector 120 of FIG. 1.

As illustrated in FIG. 11, the sub-reflector 124 may have a corrugated structure.

According to another example embodiment, the sub-reflector 124 may have a step-like structure. A material of the sub-reflector 124 may be a metal such as aluminum.

The above-described example embodiments of the present disclosure are merely specific examples and are not intended to limit the technical scope of the present disclosure. For the sake of convenience in description of the specification, description of other functional features of antenna-related configurations will be omitted. Further, the connection or connection member of lines between constituent elements illustrated in the drawings exemplarily illustrates a functional connection and/or a physical or circuit connection. In an actual apparatus, the connection or connection member of lines between constituent elements may be represented as various alternative (or additional) functional connections, various alternative (or additional) physical connections, or various alternative (or additional) circuit connections.

In this specification (in particular, the claims), the word "above" and similar directives may be used to include the singular form or the plural form. In addition, when the word "range" is described herein, the range may be understood to include individual values in the range (unless otherwise specified). In the detailed description, each individual value constituting the range may be understood to be merely described. In addition, respective operations constituting a method described herein may not be necessarily performed in the order of the respective operations, but may be performed while being rearranged in a suitable sequence unless the context clearly dictates a specific sequence, or unless otherwise specified. Further, all examples or exemplary terms (for example, "and (or) the like") may be used for the purpose of merely specifically describing the technical spirit and the scope of the present disclosure is not limited to the above examples or exemplary terms unless they are limited by the claims. Those skilled in the art may add various modification, combinations and variations to example embodiments described in this specification according to design conditions and factors, and may implement another example embodiments that fall within the scope of the claims or the range of equivalents thereof.

It will be apparent to those skilled in the art that various modifications and variations can be made in the antenna apparatus of the present invention without departing from the spirit or scope of the invention. Thus, it is intended that the present invention cover the modifications and variations of this invention provided they come within the scope of the appended claims and their equivalents.

What is claimed is:

1. An antenna apparatus, comprising:

a parabolic reflector;

a dielectric support pedestal having a corrugated structure;

a sub-reflector connected to an upper part of the dielectric support pedestal, the sub-reflector having a step-like structure along a lower side of the sub-reflector and a planar structure along an upper side of the sub-reflector;

a waveguide connected to a lower part of the dielectric support pedestal, wherein the parabolic reflector has a curved surface in which a ratio of a focal length to a diameter is greater than a preset value, and a plurality of separable corrugations configured to suppress a cross polarization is formed in a region of the dielectric support pedestal, wherein a direction in which at least one corrugation protrudes from the dielectric support pedestal is parallel to a longitudinal of the waveguide, wherein the plurality of separable corrugations are coupled to the upper part of the dielectric support pedestal, the dielectric support pedestal includes a plurality of mounting areas corresponding to a shape of the plurality of separable corrugations, respectively, and the plurality of separable corrugations are mounted on the dielectric support pedestal through the plurality of separable mounting areas, respectively.

2. The antenna apparatus of claim 1, wherein the preset value is 0.25.

3. The antenna apparatus of claim 1, wherein the lower part of the dielectric support pedestal includes a step-like impedance matching part.

4. The antenna apparatus of claim 1, wherein each of the plurality of separable corrugations is configured to be coupled to a region of the upper part.

5. The antenna apparatus of claim 1, wherein each of the plurality of separable corrugations has a hollow cylindrical shape formed in a coaxial relationship with a central axis of the dielectric support pedestal.

6. The antenna apparatus of claim 1, wherein the plurality of separable corrugations are formed to protrude from the dielectric support pedestal along a direction of a central axis of the dielectric support pedestal.

7. The antenna apparatus of claim 1, wherein the plurality of separable corrugations includes:

a first hollow cylindrical corrugation formed in a coaxial relationship with a central axis of the dielectric support pedestal, and a second hollow cylindrical corrugation formed in the coaxial relationship with the central axis, and wherein an inner diameter of the first hollow cylindrical corrugation is greater than an outer diameter of the second hollow cylindrical corrugation, and a height of the first hollow cylindrical corrugation is greater than a height of the second hollow cylindrical corrugation.

8. The antenna apparatus of claim 1, wherein the dielectric support pedestal is made of a dielectric with a dielectric constant greater than 2.

9. The antenna apparatus of claim 1, further comprising: a polarizer connected to the waveguide, wherein the polarizer includes at least one of a septum polarizer, a corrugated polarizer, and a polarizer to which a dielectric vane is applied.

10. The antenna apparatus of claim 1, wherein a material of the sub-reflector is aluminum.

* * * * *